United States Patent Office 3,077,986
Patented Feb. 19, 1963

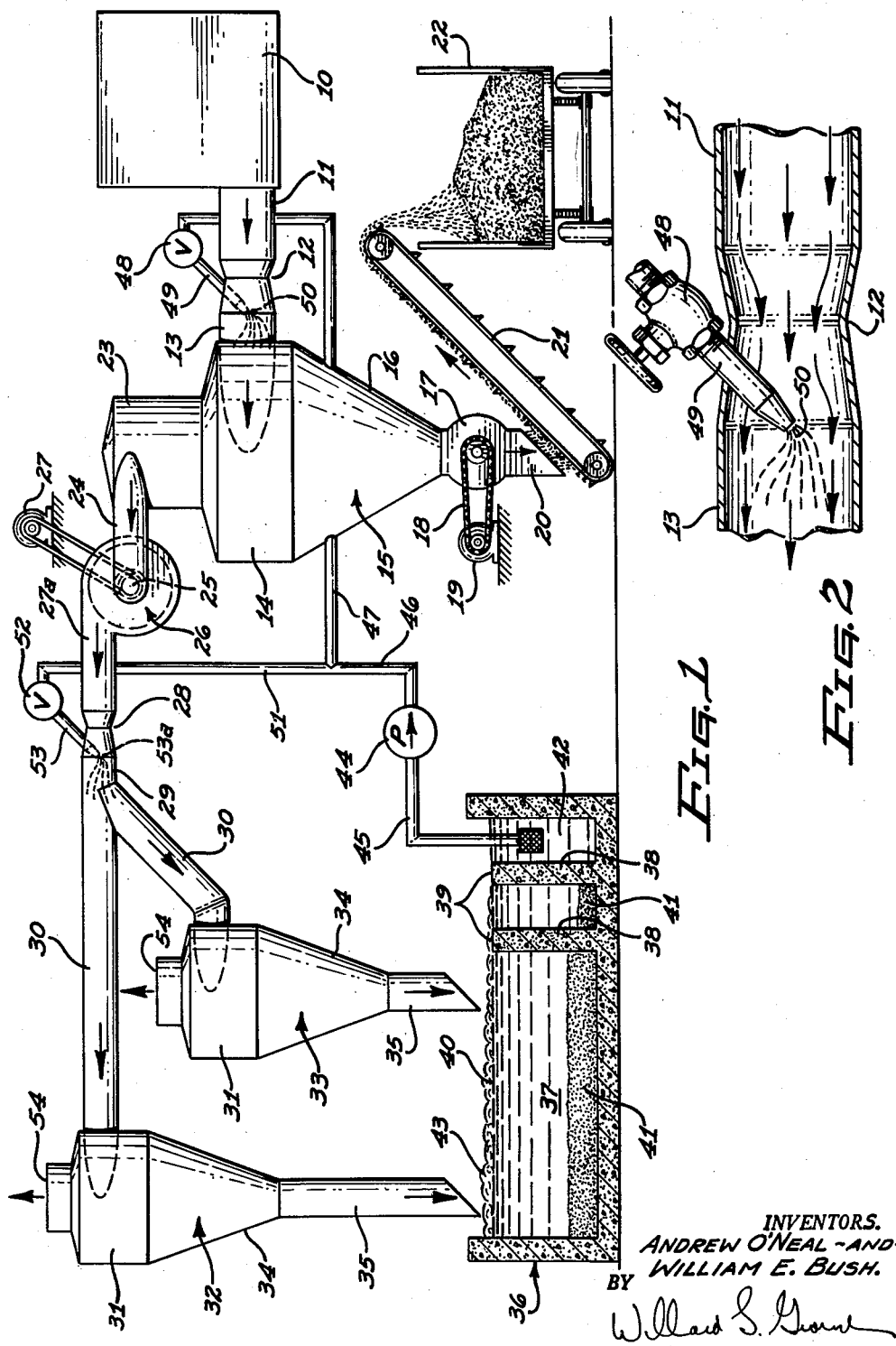

3,077,986
PRODUCTS AND FINES RECOVERY SYSTEM
Andrew O'Neal, 3649 W. Lawrence Road, Phoenix, Ariz., and William E. Bush, 414 S. 63rd Place, Scottsdale, Ariz.
Filed Nov. 20, 1961, Ser. No. 153,531
2 Claims. (Cl. 209—144)

This invention pertains to improvements in a products and fines recovery system and is more particularly directed to a cotton gin trash reclaimer apparatus.

One of the objects of this invention is to provide an improved reclaiming apparatus for products and fines from industrial and agricultural processing which provides a maximum protection against atmospheric contamination and air pollution.

Another object of this invention is to provide a dust collector for a cotton gin and the like which substantially completely reclaims the products and fines of the ginning operation and prevents their loss into the atmosphere.

A further object of this invention is to provide a products and fines recovery system in which both vacuum and moisture is applied in the operation to provide complete dust control in the reclaiming of the desired products and fines.

Further features and advantages of this invention will appear from a detailed description of the drawings in which:

FIG. 1 is a diagram showing the relationship of the essential elements of the system.

FIG. 2 is an enlarged fragmentary view of one of the water injection venturi tubes.

As an example of one embodiment of this invention, there is shown a cotton gin 10 having a trash discharge pipe 11 which is connected to a venturi tube 12. Discharge from the venturi tube 12 is connected to the tangential input pipe 13 to the swirling chamber 14 of a cyclone separator 15. The conical bottom portion 16 is connected to the usual rotary air lock 17 driven through the chain 18 by a suitable motor 19 so that the collected material in the cyclone separator 15 may discharge out through the pipe 20 onto a suitable conveyor 21 into a suitable truck or trailer 22 for final disposal of the collected trash.

Connected to the plenum chamber 23 of the cyclone separator 15 is a suction pipe 24 which is connected to the suction input 25 of a blower 26 driven by a suitable motor 27. Discharge from the blower 26 passes through the pipe 27a, the venturi tube 28 and then through the pipe 29 and the tangential input pipes 30 to the swirling chambers 31 of one or more cycline separators 32 and 33. Discharge from the conical bottom portions 34 of the separators 32 and 33 passes down through the pipes 35 into the sludge reservoir 36 in which is maintained a supply of water 37 for the functioning of the above described apparatus.

The sludge reservoir 36 has a series of baffles 38 and spillways 39 at the water level 40 to cause settling of the sludge 41 and isolation of the sludge from the water withdrawal compartment 42. The sludge 41 and any froth 43 which accumulates in the reservoir 36 is periodically removed and disposed of. A water pump 44 has a suction line 45 connected into the water withdrawal compartment 42 of the reservoir 36 and discharges out through the pressure line 46. A branch line 47 is connected through a suitable flow regulating valve 48 to an injector pipe 49 which discharges at the point 50 at the discharge end of the venturi tube 12 in the direction of the air flow in the pipe 13. Similarly, a branch line 51 from the line 46 is connected through a suitable flow regulating valve 52 to an injector pipe 53 which discharges at the point 53a at the discharge end of the venturi tube 28 in the direction of the air flow in the pipe 29.

By utilizing the venturi tubes 12 and 28 and injecting the water at the respective points 50 and 53a, the water becomes instantly absorbed in the air streams at the point of expansion and reduced pressure as it leaves the venturi restrictions. This further provides rapid and efficient mixing and absorption with the material being carried by the air stream in the pipes.

In operation: the blower 26 maintains a high vacuum in the low velocity cyclone separator 15 and sucks the trash through lines 11, venturi tube 12, and line 13 into the separator 15. Water injected at point 50 is regulated so as to thoroughly humidify and dampen the trash as it proceeds through pipe 13 and enters the low velocity cyclone separator 15. The combination of the vacuum operation of the separator 15 and the moisturizing of the incoming trash as described provides a highly efficient operation of the separator with maximum collection of materials and the discharge of the same out through the air lock 17 without sticking and collection of the material on the sides of the separator 15.

In order to finally trap the microscopic fines which may pass through the blower 26, the discharge from the blower 26 is passed through the venturi tube 28 and as it leaves the venturi tube 28 it is saturated and flooded with an excess of water whereupon it enters the high velocity cyclones 32 and 33. Because of the excess of water applied at point 53a the fines material is literally washed down or flows down the conical sides 34 of the separators 32 and 33 and drains into the sludge reservoir 36, the excess cleaned air from the blower 26 discharging out through the top discharge pipes 54 of these separators. Thus both the trash products and fines are substantially completely recovered from the ginning operation without contaminating the atmosphere.

While the apparatus herein disclosed and describedl constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A products and fines recovery system including in combination:
   (a) a first cyclone separator having,
   (b) a tangential input pipe,
   (c) a swirl chamber and,
   (d) a plenum air discharge chamber,
   (e) a trash discharge pipe connected to a source of trash to be treated and to said tangential input pipe,
   (f) a conical material collecting and discharge bottom on said first cyclone separator,
   (g) a rotary air lock on said bottom of said first cyclone separator adapted to restrict upward inward air flow in said bottom while allowing collected material therein to be discharged from said bottom,
   (h) a suction pipe connected to said plenum air discharge chamber of said first cyclone separator,
   (i) a blower having
   (j) a suction input connected to said suction pipe connected to said plenum air discharge chamber of said first cyclone separator,
   (k) a plurality of second cyclone separators each having,
   (l) a tangential input pipe,
   (m) a swirl chamber and,
   (n) a plenum air discharge chamber open to atmosphere,
   (o) a discharge pipe connected between the discharge from said blower and said tangential input pipes of said second cyclone separators, (p) material discharge bottom portions for each of said second cyclone separators open to atmosphere and adapted to discharge collected materials therefrom, (q) a sludge reservoir adapted to receive discharged material from the bottom discharge of said second plurality of cyclone separators, (r) means in said sludge reservoir to cause separation of sludge from the water therein, (s) a water pump having, (t) a suction line connected to withdraw water from said sludge reservoir, (u) a first injector pipe adapted to discharge into said trash discharge pipe between said source of trash and said first cyclone separator, (v) a second injector pipe adapted to discharge into said discharge pipe between said blower and said second cyclone separators, (w) and piping connecting the discharge from said water pump to said first and second injector pipes.

2. A products and fines recovery system including in combination:

(a) a first large diameter low velocity cyclone separator for trapping the heavy trash materials having, (b) a tangential input pipe, (c) a swirl chamber and, (d) a plenum air discharge chamber, (e) a trash discharge pipe interconnected between a source of trash to be treated and said tangential input pipe of said first cyclone separator, (f) a conical material collecting bottom having a discharge opening for said first cyclone separator, (g) a rotary air lock in said discharge opening adapted to restrict inward air flow through said discharge opening while permitting collected material in said first cyclone to discharge downwardly and outwardly through said discharge opening, (h) a suction pipe connected to said plenum air discharge chamber of said first cyclone separator, (i) a blower having, (j) a suction input connected to said suction pipe connected to said plenum air discharge chamber of said first cyclone separator, (k) a plurality of second smaller diameter high velocity cyclone separators for trapping microscopic particles each having, (l) a tangential input pipe, (m) a swirl chamber and, (n) a plenum air discharge chamber open to atmosphere, (o) a discharge pipe connected between the discharge from said blower and said tangential input pipes of said second cyclone separators, (p) microscopic particle discharge bottom portions for each of said second cyclone separators open to atmosphere, (q) a sludge reservoir adapted to receive discharged material from the bottom discharge portions of said second cyclone separators, (r) means in said sludge reservoir to cause separation of sludge from the water therein, (s) a water pump having, (t) a suction line connected to withdraw clear water from said sludge reservoir, (u) a first injector pipe adapted to discharge a limited supply of water into said trash discharge pipe between said source of trash and said first cyclone separator so as to humidify and dampen the trash passing through said trash discharge pipe, (v) a second injector pipe adapted to discharge a copious flood of water into said discharge pipe between said blower and said second cyclone separators so as to saturate the microscopic fines passing through said discharge pipe into said second cyclone separators so that said fines material is washed down and flows down the discharge bottom portions of said second cyclone separators, (w) and piping connecting the discharge from said water pump to said first and second injector pipes.

References Cited in the file of this patent

UNITED STATES PATENTS

| | | |
|---|---|---|
| 710,605 | Osborne | Oct. 7, 1902 |
| 2,217,538 | Carson | Oct. 8, 1940 |
| 2,460,938 | Koehne | Feb. 8, 1949 |
| 2,604,185 | Johnstone | July 22, 1952 |
| 2,919,898 | Marwil | Jan. 5, 1960 |